United States Patent
Bashar

(10) Patent No.: US 12,188,716 B2
(45) Date of Patent: Jan. 7, 2025

(54) METHOD AND APPARATUS FOR FREEZING DISPENSED DROPLETS OF LIQUID

(71) Applicant: GEN-PROBE INCORPORATED, San Diego, CA (US)

(72) Inventor: Reza Bashar, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 18/231,440

(22) Filed: Aug. 8, 2023

(65) Prior Publication Data

US 2023/0392850 A1 Dec. 7, 2023

Related U.S. Application Data

(63) Continuation of application No. 15/734,935, filed as application No. PCT/US2019/037230 on Jun. 14, 2019, now Pat. No. 11,867,460.

(Continued)

(51) Int. Cl.
*F25D 3/11* (2006.01)
*A01N 1/02* (2006.01)
*B01J 2/06* (2006.01)

(52) U.S. Cl.
CPC .............. *F25D 3/11* (2013.01); *A01N 1/0252* (2013.01); *B01J 2/06* (2013.01)

(58) Field of Classification Search
CPC ...... F25D 3/11; F25C 1/00; B01J 2/06; A01N 1/0252; B01L 3/0268; B01L 3/0265; B01L 3/0241; G01N 2035/1034
See application file for complete search history.

(56) References Cited

U.S. PATENT DOCUMENTS

| 3,655,838 A | 4/1972 | Price et al. |
| 4,077,227 A | 3/1978 | Larson |

(Continued)

FOREIGN PATENT DOCUMENTS

| CA | 1217351 A | 2/1987 |
| CN | 1429329 A | 7/2003 |

(Continued)

OTHER PUBLICATIONS

Chinese Office Action and Search Report w/English translation and claims dated Sep. 16, 2021 in related Chinese Application No. 201980041225.2 (17 pages total).

(Continued)

*Primary Examiner* — Frantz F Jules
*Assistant Examiner* — Martha Tadesse
(74) *Attorney, Agent, or Firm* — ROTHWELL, FIGG, ERNST & MANBECK, P.C.; Jeff Landes

(57) ABSTRACT

A method and apparatus for freezing a liquid droplet includes dispensing, by a liquid dispenser, a droplet of liquid into a fluid chamber containing a freezing liquid. The droplet of liquid is allowed to dwell in the freezing liquid for at least a predetermined dwell time so that the droplet of liquid freezes to a frozen droplet. The method and apparatus further includes injecting, by a gas injector, a stream of gas transversely to a surface of the freezing liquid at about where the frozen droplet is located along the surface of the freezing liquid contained in the fluid chamber so that the frozen droplet sinks in the freezing liquid.

9 Claims, 6 Drawing Sheets

Related U.S. Application Data

(60) Provisional application No. 62/687,562, filed on Jun. 20, 2018.

(56) References Cited

U.S. PATENT DOCUMENTS

| | | | |
|---|---|---|---|
| 4,211,015 | A | 7/1980 | Adams et al. |
| 4,704,837 | A | 11/1987 | Imaike et al. |
| 4,704,873 | A * | 11/1987 | Imaike ................ A23L 3/36 |
| | | | 62/538 |
| 4,704,874 | A | 11/1987 | Thompson et al. |
| 4,848,094 | A | 7/1989 | Davis et al. |
| 4,967,571 | A | 11/1990 | Kirkwood et al. |
| 5,275,016 | A | 1/1994 | Chatterjee et al. |
| 5,413,732 | A | 5/1995 | Buhl et al. |
| 7,353,657 | B2 | 4/2008 | Craig |
| 9,417,166 | B2 | 8/2016 | Thorne et al. |
| 2010/0216230 | A1 | 8/2010 | Thorne et al. |
| 2014/0335554 | A1* | 11/2014 | Larson ................ G01N 1/286 |
| | | | 73/864.45 |
| 2016/0074857 | A1* | 3/2016 | Li ................ B01L 3/0268 |
| | | | 422/501 |
| 2021/0190403 | A1 | 6/2021 | Bashar |

FOREIGN PATENT DOCUMENTS

| | | |
|---|---|---|
| CN | 103370610 A | 10/2013 |
| DE | 19755578 A1 | 6/1999 |
| DE | 19755579 A1 | 6/1999 |
| EP | 0225081 A1 | 6/1987 |
| EP | 0225081 A2 | 6/1987 |
| EP | 1666135 A1 | 6/2006 |
| GB | 2527853 A * | 1/2016 ................ A61J 3/00 |
| JP | 62196575 A | 8/1987 |
| WO | 93/22598 A1 | 11/1993 |
| WO | 02/061351 A1 | 8/2002 |
| WO | 2012/074771 A2 | 6/2012 |

OTHER PUBLICATIONS

Examination Report No. 1 dated Nov. 19, 2021 in related Australian Application No. 2019289113 (6 pages total).
Corrected English translation of Chinese Office Action and Search Report dated Sep. 16, 2021 in related Chinese Application No. 201980041225.2 (4 pages total).
Examination Report dated Mar. 16, 2022 in related Canadian Application No. 3,101,599 (3 pages).
Examination Report No. 2 dated Mar. 30, 2022 in related Australian Application No. 2019289113 (4 pages total).
Chinese Office Action and Search Report with English translations dated May 16, 2022 in related Chinese patent application No. 201980041225.2 (21 pages).
Examination Report No. 3 dated Jul. 19, 2022 in related Australian Application No. 2019289113 (4 pages total).
European Examination Report dated Apr. 18, 2023 in corresponding European Patent Application No. 19734217.3 (7 pages).
PCT International Search Report and Written Opinion, International Application No. PCT/US2019/037320, Sep. 24, 2019.
PCT International Preliminary Report on Patentability, International Application No. PCT/US2019/037320, Dec. 22, 2020.
Ash, W. "Quantity Productiono of Polarized Target Material" Nuclear Instruments and Methods, 134 (1976), pp. 9-10.
Non-Final Office Action dated Mar. 26, 2024 in related U.S. Appl. No. 18/238,845 (12 pages).

* cited by examiner

METHOD AND APPARATUS FOR FREEZING DISPENSED DROPLETS OF LIQUID

CROSS-REFERENCE TO RELATED APPLICATION

This application is a continuation of U.S. patent application Ser. No. 15/734,935, filed Dec. 3, 2020, which is a 35 U.S.C. 371 National Phase Entry Application from PCT/US2019/037230, filed Jun. 14, 2019, which claims the benefit under 35 U.S.C. § 119(e) of the filing date of U.S. Provisional Patent Application Ser. No. 62/687,562 filed Jun. 20, 2018, the respective disclosures which are incorporated herein by reference.

FIELD OF THE DISCLOSURE

This disclosure relates to apparatuses and methods for freezing dispensed droplets of liquid in a fluid chamber.

BACKGROUND

Analytical processes of biological fluids, such as blood, typically combine the analyzed fluid with one or more reagents to trigger the occurrence of a detectable property that corresponds to a measured parameter of the analytical process. One example includes combining blood plasma with a reagent to undergo a reaction that changes the color or the visibility of the detectable property, which may be measured by processing equipment. The processing equipment may be supplied with a biological sample and one or more lyophilized reagent pellets that may be reconstituted during the analytical process.

One known method for producing lyophilized reagents includes the step of dispensing liquid reagent droplets of precise volume into a freezing liquid bath in which the liquid droplets freeze and sink to the bottom of the bath. After sinking to the bottom of the bath, the known method includes removing the frozen droplets from the bath and lyophilizing the frozen droplets. In some instances, however, other factors, such as surface tension at the top surface of the freezing liquid, hinder the frozen droplets of liquid reagent from sinking to the bottom of the bath such that the droplets of liquid reagent tend to float near the surface of the freezing liquid. Consequently, subsequent dispensed liquid reagent droplets may combine with the floating droplet, thus resulting in an inaccurate reagent dosage for the combined droplet. Thus, there is a need for improved apparatuses and methods that promote dispensed droplets of liquid to sink to the bottom of a freezing liquid bath.

SUMMARY

The following presents a simplified summary in order to provide a basic understanding of some aspects described herein. This summary is not an extensive overview of the subject matter disclosed herein. It is intended to neither identify key or critical elements of the claimed subject matter nor delineate the scope thereof. Its sole purpose is to present some concepts in a simplified form as a prelude to the more detailed description that is presented later.

The present disclosure includes various examples of an apparatus for freezing liquid droplets. In accordance with one example, the apparatus comprises a fluid chamber containing a fluid, a liquid dispenser, a gas injector, and a transporter. The liquid dispenser is configured to dispense a droplet of liquid into the fluid chamber. The gas injector is configured to inject a stream of gas transversely to a surface of the fluid contained in the fluid chamber. The transporter is configured to transport at least one of the fluid chamber, the liquid dispenser, and the gas injector relative to each other such that the liquid dispenser dispenses the droplet of liquid on the surface of the fluid contained in the fluid chamber, and the gas injector injects the stream of gas at about where the dispensed droplet of the liquid is located along the surface of the fluid contained in the fluid chamber.

In some examples, the transporter is configured to transport the fluid chamber between a first position below the liquid dispenser and a second position below the gas injector. The liquid dispenser is configured to dispense a droplet of liquid into the fluid chamber when the fluid chamber is in the first position. The gas injector is configured to inject the gas stream transversely to the surface of the fluid contained in the fluid chamber when the fluid chamber is in the second position.

In some examples, the fluid contained in the fluid chamber is a cryogenic liquid configured to freeze the dispensed droplet of liquid to a frozen droplet. In some examples, the cryogenic liquid is liquid nitrogen. In some examples, the transporter comprises a carousel configured to move the fluid chamber about an axis of rotation between the first position and the second position. In some examples, the carousel comprises a drum, and the fluid chamber is disposed within the drum. In some examples, the carousel comprises a spindle configured to rotate about the axis of rotation, and the spindle is coupled to the drum such that the drum is configured to rotate with the spindle about the axis of rotation. In some examples, the carousel comprises a lid coupled to a top end of the drum. In some examples, the lid is removable from the top end of the drum. In some examples, the fluid chamber is disposed beneath the lid, and the lid comprises an opening aligned with the fluid chamber. In some examples, the fluid chamber is removable from the drum. In some examples, the drum is comprised of stainless steel. In some examples, the carousel comprises an insulation layer disposed between the drum and the fluid chamber. In some examples, the insulation layer comprises air.

In some examples, the apparatus comprises multiple fluid chambers, in which the transporter is configured to transport each fluid chamber between the first position below the liquid dispenser and the second position below the gas injector. In some examples, the apparatus comprises multiple liquid dispensers, in which the transporter is configured to transport each fluid chamber to the first position below a respective one of the liquid dispensers. In some examples, the apparatus comprises multiple gas injectors, in which the transporter is configured to transport each fluid chamber to the second position below a respective one of the gas injectors. In some examples, the gas injector comprises a nozzle disposed above the fluid chamber, in which the nozzle is configured to inject the gas stream transversely to the surface of the fluid contained in the fluid chamber. In some examples, the gas injector is configured to inject the gas stream transversely to the surface of the fluid contained in the fluid chamber only when the fluid chamber is in the second position.

In some examples, the apparatus comprises a solenoid valve controlling gas flow to the nozzle and configured to switch between a closed position to shut-off the gas stream from reaching the nozzle and an open position to permit the gas stream to reach the nozzle. In some examples, the apparatus comprises a sensor configured to generate a signal relating to a position of the transporter and a control unit in electrical communication with the sensor and the solenoid valve, in which the control unit is configured to receive the signal from the sensor and transmit a command to the solenoid valve to switch between the open and closed positions based on the signal. In some examples, the transporter is configured to transport the liquid chamber from the first position to the second position at a predetermined dwell time so that the droplet of liquid freezes to the frozen droplet before the gas injector injects the stream of gas transversely to the surface of the fluid contained in the fluid chamber.

In some examples, the liquid dispenser comprises a nozzle, in which the nozzle is configured to dispense the droplet of liquid into the fluid chamber. In some examples, the nozzle of the liquid dispenser comprises a tip located above the surface of the fluid contained in the fluid chamber at a predetermined distance. In some examples, the predetermined distance between the tip of the nozzle of the liquid dispenser and the surface of the fluid contained in the fluid chamber is set from about ¾ of an inch to about 2 inches.

In another example, a method for freezing liquid droplets comprises a step (a) of dispensing a droplet of liquid into a fluid chamber containing a freezing fluid, a step (b) of allowing the droplet of liquid to dwell in the freezing fluid for at least a predetermined dwell time so that the droplet of liquid freezes to a frozen droplet, and a step (c) of injecting a stream of gas transversely to a surface of the freezing fluid at about where the frozen droplet is located along the surface of the freezing fluid so that frozen droplet sinks in the freezing fluid. In some examples, step (a) further comprises using a liquid dispenser to dispense the droplet of liquid into the fluid chamber containing the freezing fluid. In some examples, step (c) further comprises using a gas injector to inject the stream of gas transversely to the surface of the freezing liquid.

In some examples, step (c) further comprises monitoring the predetermined dwell time and automatically injecting the stream of gas transversely to the surface of the freezing fluid after the predetermined dwell time. In some examples, the method further comprises the step of transporting the fluid chamber by a transporter from a first position below a liquid dispenser to a second position below a gas injector. In some examples, the method comprises the steps of monitoring a position of the transporter and automatically injecting the stream of gas when the fluid chamber is at a position beneath the gas injector. In some examples, the method further comprises the step of transporting the fluid chamber by the transporter from the second position below the gas injector back to the first position below the liquid dispenser. In some examples, the method further comprises, after the step of returning the fluid chamber back to the first position, the step of dispensing a second droplet of liquid into the liquid chamber.

In some examples, the fluid chamber is integrally attached to the transporter. In some examples, the fluid chamber is removably coupled to the transporter. In some examples, the transporter comprises a carousel, and the step of transporting further comprising rotating, by the carousel, the fluid chamber about an axis of rotation from the first position to the second position. In some examples, the carousel comprises a drum and the liquid chamber is disposed within the drum. In some examples, the carousel comprises a lid coupled to a top end of the drum. In some examples, the lid is removable from the top end of the drum.

In some examples, the method comprises, before step (a), moving a liquid dispenser over the fluid chamber to align the liquid dispenser with a target zone located along the surface of the freezing fluid contained in the fluid chamber. In some examples, step (a) further comprises dispensing, by the liquid dispenser, the droplet of liquid at the target zone. In some examples, the method comprises, after step (a) and before step (c), moving a gas injector over the fluid chamber to align the gas injector with the target zone located along the surface of the freezing fluid contained in the fluid chamber. In some examples, step (c) further comprises injecting, by the gas injector, the stream of gas at the target zone. In some examples, the fluid chamber comprises a stationary bath containing the freezing fluid.

In some examples, the method further comprises after step (c), collecting, by a retainer basket, the frozen droplet sinking toward a bottom of the fluid chamber. In some examples, the method further comprises after the step of collecting the frozen droplet, drying the frozen droplet. In some examples, the step of drying the frozen droplet comprises lyophilizing the frozen droplet.

In accordance with another example, the apparatus comprises a fluid chamber containing a fluid, a liquid dispenser, and a gas injector. The liquid dispenser is configured to move relative to the fluid chamber so that the liquid dispenser is aligned above a target zone located along the surface of the fluid contained in the fluid chamber. The liquid dispenser is configured to dispense a droplet of liquid into the fluid chamber at the target zone. The gas injector is configured to move relative to the fluid chamber so that the gas injector is aligned above the target zone located along the surface of the fluid contained in the fluid chamber. The gas injector is configured to inject a gas stream transversely to the surface of the fluid contained in the fluid chamber at the target zone.

In some examples, the fluid chamber comprises a stationary bath containing the fluid. In some examples, the liquid dispenser is configured to move in a longitudinal direction along the bath and dispense multiple droplets of liquid at multiple target zones arranged in the longitudinal direction along the surface of the fluid contained in the bath. In some examples, the liquid dispenser is configured to move in a lateral direction along the bath and dispense multiple droplets of liquid at multiple target zones arranged in the lateral direction along the surface of the fluid contained in the bath. In some examples, the gas injector is configured to move in a longitudinal direction along the bath and inject multiple streams of gas transversely to the surface of the fluid contained in the bath at multiple target zones arranged in the longitudinal direction along the surface of the fluid contained in the bath. In some examples, the gas injector is configured to move in a lateral direction along the bath and inject multiple streams of gas transversely to the surface of the fluid contained in the bath at multiple target zones arranged in the lateral direction along the surface of the fluid contained in the bath. In some examples, the gas injector is configured to wait for at least a predetermined dwell time after the liquid dispenser dispenses the droplet of liquid at the target zone before injecting the stream of gas at the target zone.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
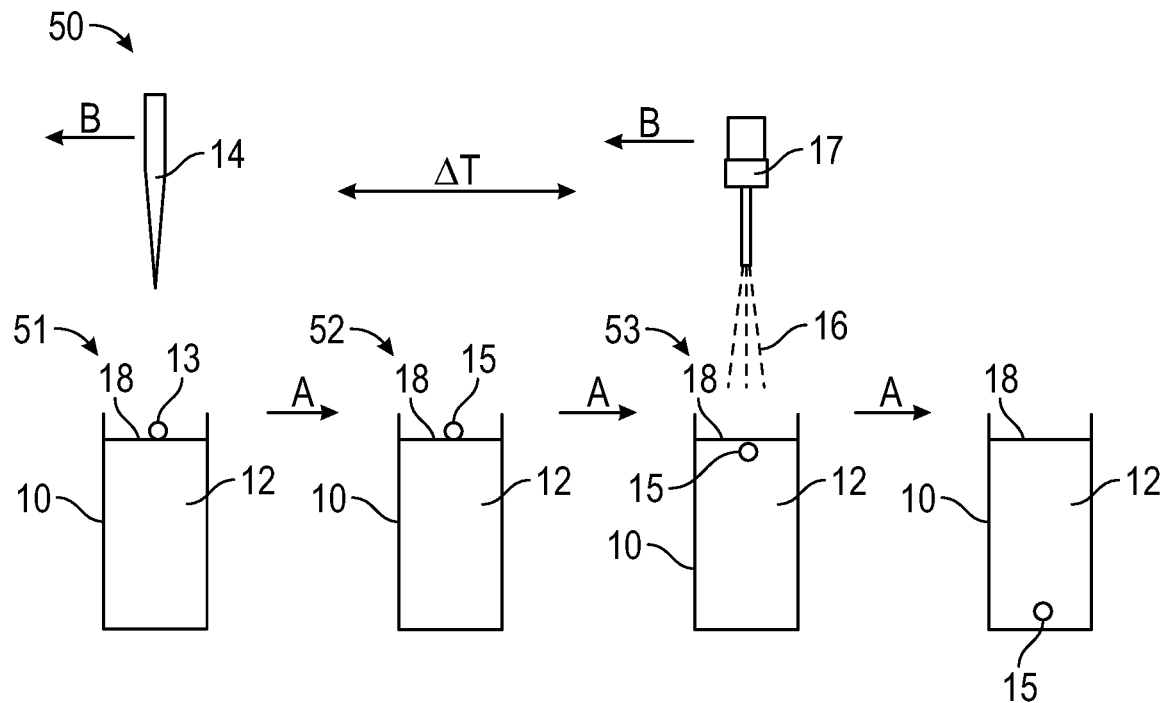
FIG. 1 is a schematic drawing of an exemplary process for freezing liquid droplets.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "group" refers to a collection of one or more objects. Thus, for example, a group of objects can include a single object or multiple objects. Objects of a group also can be referred to as members of the group. Objects of a group can be the same or different. In some instances, objects of a group can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

The term "reagent" means one or more reagents or components necessary or desirable for use in one or more reactions or processes, for example, one or more components that in any way affect how a desired reaction can proceed. The reagent can comprise a reactive component. However, it is not necessary that the reagent participate in the reaction. The reagent can comprise a non-reactive component. The reagent can comprise a promoter, accelerant, or retardant that is not necessary for a reaction but affects the reaction, for example, affects the rate of the reaction. The reagent can comprise one or more of a solid reagent for reaction and a fluid reagent for reaction.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve disposed in the fluid processing passageway.

The term "cryogenic liquid" refers to a liquefied gas that keeps its liquid state at substantially low temperatures. In one example, the term "cryogenic liquid" refers to a liquefied gas having a normal boiling point below about −75° C. In another example, the term "cryogenic liquid" refers to a liquefied gas having a normal boiling point below about −150° C. Examples of cryogens include argon (Ar), helium (He), hydrogen gas ($H_2$), nitrogen gas ($N_2$), oxygen ($O_2$), methane ($CH_4$), and carbon monoxide (CO).

The term "lyophilization" refers to a dehydration process that is typically used to preserve a perishable material and/or facilitate transport thereof. Conditions for lyophilization may include subjecting a liquid material and/or a vessel containing the liquid material to freezing conditions while reducing the surrounding pressure to allow the frozen water within the material to sublimate directly from the solid phase to the gas phase. Such freezing conditions may include cooling the material below the lowest temperature at which the solid and liquid phases thereof can coexist (known in the art as the "triple point"). Usually, the freezing temperatures are between −50° C. and −80° C., however, one of skill in the art can determine the appropriate freezing temperature to lyophilize the reagent for use in the automated biochemical assay.

Figure 2:
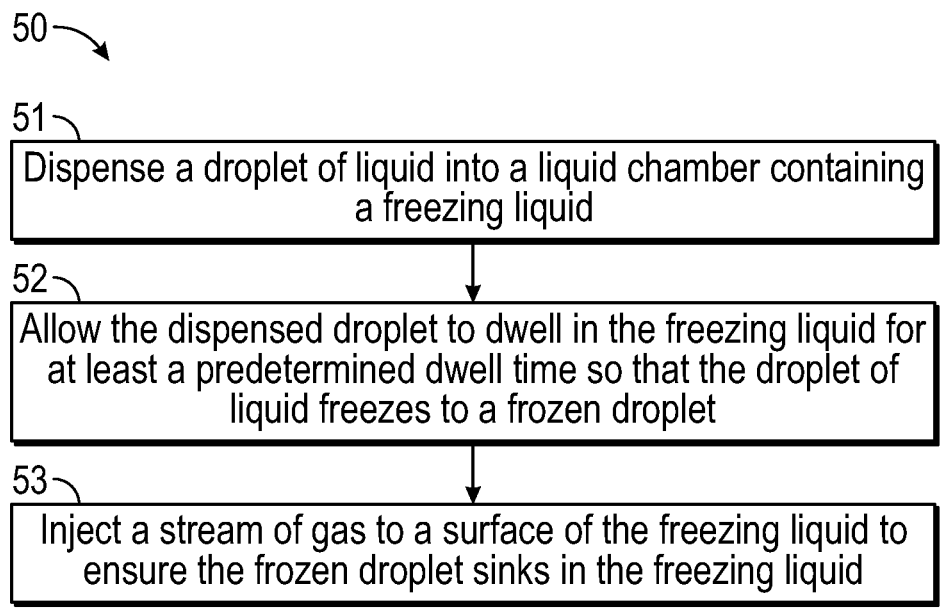
FIG. 2 is a flow chart of an exemplary method for freezing liquid droplets.

FIGS. 1 and 2 illustrate a method 50 for freezing liquid droplets in a fluid chamber 10 containing a freezing liquid 12 according to an example. The method 50 includes a step, or process, 51 of dispensing a droplet of liquid 13 into the fluid chamber 10 containing the freezing fluid 12 having a surface 18. In one example, the freezing fluid 12 is a cryogenic liquid, such as liquid nitrogen, and the droplet 13 is dispensed by a liquid dispenser 14. The liquid dispenser 14 is configured to drop individual liquid droplets of reagent solution, whereby each droplet is of substantially uniform size.

Once the droplet of liquid is received on the surface 18 of the freezing fluid 12, the method 50 includes a step 52 of allowing the droplet of liquid 13 to dwell in the freezing fluid 12 for at least a predetermined dwell time ΔT so that the droplet of liquid 13 freezes to a frozen droplet 15. In some non-limiting examples, the predetermined dwell time ΔT includes at least the period of time between when the dispensed liquid droplet 13 initially contacts the surface of the freezing fluid 12 and when the dispensed liquid droplet 13 fully submerges under the surface of the freezing fluid 12. In some examples, the predetermined dwell time ΔT is calculated from a number of parameters, including the composition of liquid solution dispensed from the liquid dispenser 14, the mass and volume of the liquid droplet 13, the composition of the freezing fluid 12, the temperature of the freezing fluid 12, and the pressure of the fluid chamber 10. The predetermined dwell time ΔT may be extended to account for possible air bubbles trapped inside of the dispensed liquid droplet 13, interaction between the dispensed liquid droplet 13 and the surface of the freezing fluid 12, and temperature differentials between the dispensed liquid droplet 13 and the temperature of the freezing fluid 12. Accordingly, the predetermined dwell time ΔT may vary based on the composition selected for the liquid dispensed into the fluid chamber, the composition selected for the freezing fluid contained in the fluid chamber, and the interaction between the dispensed liquid droplet 13 and the freezing fluid 12. In some examples, the predetermined dwell time ΔT is one minute or less.

After allowing the droplet of liquid 13 to dwell in the freezing fluid 12 for at least the predetermined dwell time ΔT so that the droplet of liquid 13 freezes, the method 50 includes a step 53 of injecting, by a gas injector 17, a stream of gas 16 transversely to the surface 18 of the freezing fluid 12 at about where the frozen droplet is located along the surface of the freezing fluid 12. The impulse of the gas stream 16 contacting the frozen droplet 15 breaks the surface tension between the freezing fluid 12 and the frozen droplet 15 so that the frozen droplet 15 sinks in the freezing fluid 12.

Preferably, the stream of gas 16 is injected substantially orthogonally to the surface of the freezing fluid 12. Thus, step 53 of the method 50 ensures that the dispensed droplet of liquid 13 freezes completely to a frozen droplet 15 and that the frozen droplet 15 sinks to the bottom of the fluid chamber 10.

During the method 50, in some examples, the fluid chamber 10 may move with respect to the liquid dispenser 14 and the gas injector 17, as indicated by arrow A in FIG. 1. In some examples, the liquid dispenser 14 and the gas injector 17 may move with respect to the fluid chamber 10, as indicated by arrow B in FIG. 1. In one example, the method 50 includes holding the fluid chamber 10 at the same position during all three steps 51, 52, and 53 of the method 50 whereby the liquid dispenser 14 is positioned above the fluid chamber 10 in step 51 and the gas injector 17 is then positioned above the fluid chamber 10 in step 53. In one example, the method 50 may be automated such that step 53 further includes monitoring the predetermined dwell time ΔT and automatically injecting the stream of gas 16 transversely to the surface of the freezing fluid 12 after the predetermined dwell time ΔT.

In another example, the method includes the step of transporting the fluid chamber 10 by a transporter from a first position below the liquid dispenser 14 to a second position below the gas injector 17. In one example, the fluid chamber 10 may be transported from the first position to the second position during the step 52 of allowing the droplet of liquid 13 to dwell in the freezing fluid 12 for at least the predetermined dwell time ΔT. In one example, the method 50 may be automated such that step 53 includes monitoring a position of the transporter and the steps of automatically injecting the droplet 13 when the fluid chamber 10 is at the first position beneath the liquid dispenser 14 and automatically injecting the stream of gas 16 when the fluid chamber 10 is at the second position beneath the gas injector 17. In one example, the method 50 includes a control unit and a sensor to monitor the position of the transporter and command the gas injector 17 to inject the stream of gas 16.

In one example, after the step 53 of injecting the stream of gas 16 transversely to the surface of the freezing fluid, the method 50 further includes the step of transporting the fluid chamber 10 by the transporter from the second position below the gas injector 17 back to the first position below the liquid dispenser 14 so that another droplet of liquid 13 may be dispensed into the fluid chamber 10.

In other examples, the fluid chamber 10 comprises a bath (not shown) of freezing fluid 12. In some examples, the bath extends in a longitudinal direction from a first end to a second end and a lateral direction from a first side to a second side. In some examples, step 51 of method further comprises moving the liquid dispenser 14 over the bath of freezing fluid 12 in the longitudinal direction such that multiple droplets of liquid 13 are dispensed into the bath of the freezing fluid 12 at multiple target zones (not shown) spatially arranged along the bath of freezing fluid 12 in the longitudinal direction. In some examples, step 53 of method 50 further comprises moving the gas injector 17 in the longitudinal direction such that a gas stream 16 is injected transversely to the surface 18 of the freezing fluid 12 at about each target zone. In some examples, step 51 of method 50 further comprises moving the liquid dispenser 14 over the bath of freezing fluid 12 in a lateral direction such that multiple droplets of liquid 13 are dispensed into the bath of the freezing fluid 12 at multiple target zones spatially arranged along the bath of freezing fluid 12 in the lateral direction. In some examples, step 53 of method 50 further comprises moving the gas injector 17 in the lateral direction such that a gas stream 16 is injected transversely to the surface 18 of the freezing fluid 12 at about each target zone. In some examples, step 51 further comprises moving the liquid dispenser 14 in a longitudinal direction after dispensing multiple droplets of liquid 13 in the lateral direction along the bath of freezing fluid 12 such that multiple rows of target zones are arranged along the bath of freezing fluid. In some examples, step 53 further comprises moving the gas injector 17 in a longitudinal direction after injecting multiple streams of gas 16 transversely to the surface 18 of the freezing fluid 12 in the lateral direction such that a stream of gas 16 is injected at about each target zone.

In some other examples, the method 50 includes dispensing and freezing multiple droplets of liquid 15 simultaneously in the bath of the freezing fluid 12. In some examples, step 51 further comprises dispensing multiple droplets of liquid 13 simultaneously at multiple target zones with multiple liquid dispensers 14 arranged along the bath of freezing fluid 12 in the longitudinal direction. In some other examples, step 53 further comprises injecting multiple gas streams 16 transversely to the surface 18 of the freezing fluid 12 at about each target zone with multiple gas injectors 17 arranged along the bath of freezing fluid 12 in the longitudinal direction.

In some examples, the method 50 further comprises the step of collecting the frozen droplets 15 that sink towards the bottom of the fluid chamber 10. In some examples, the frozen droplets 15 are collected by providing a retainer basket (FIG. 9) disposed in the fluid chamber 10. In some examples, the retainer basket is configured to receive and hold the sunken frozen droplets without retaining frozen fluid 12. In some examples, the step of collecting the frozen droplets 15 includes removing the retainer basket holding the frozen droplets 15 from the fluid chamber 10.

In some examples, the method 50 further comprises the step of drying the frozen droplet 15 after the step of collecting the frozen droplets 15 such that reagent material stored in the frozen droplet 15 is preserved and portable. The step of drying the frozen droplets may include any process to dehydrate the moisture content of the frozen droplets. In some examples, the step of drying the frozen droplets comprises lyophilizing the frozen droplet.

Figure 3:
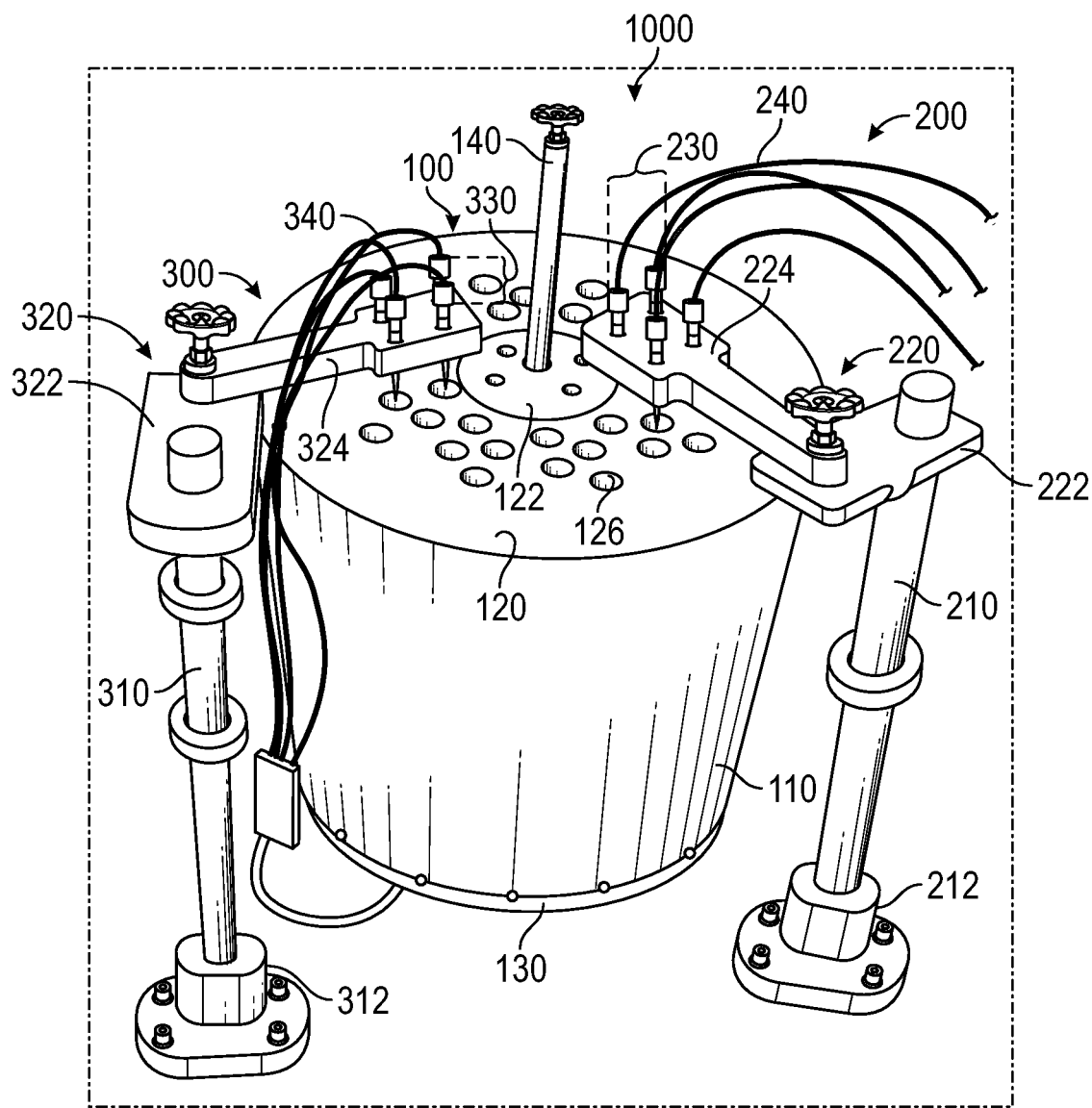
FIG. 3 is a top perspective view of an exemplary apparatus for freezing liquid droplets comprising fluid chambers, a transporter, a liquid dispenser, and a gas injector.
Figure 4:
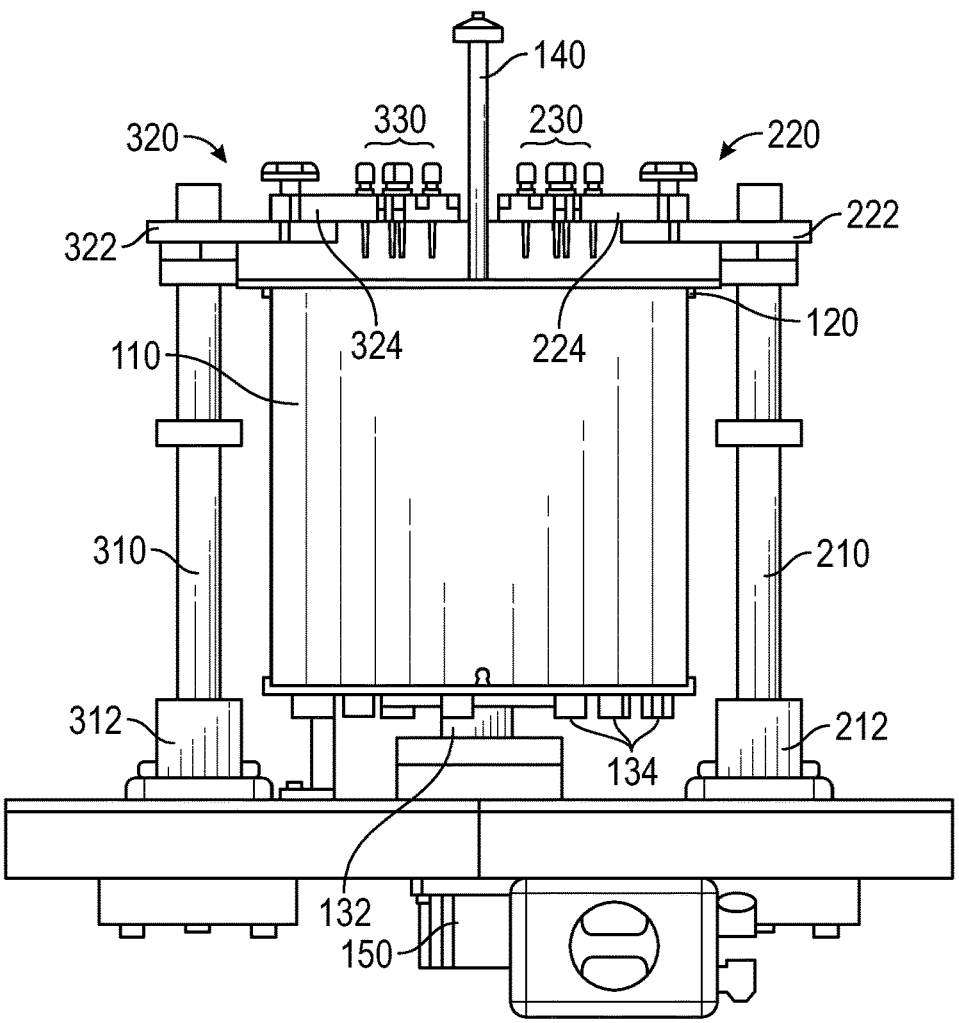
FIG. 4 is a front view of the apparatus FIG. 3.

Referring to FIGS. 3 and 4, an example of the apparatus for implementing the process described with respect to FIGS. 1 and 2 is indicated by reference number 1000 and includes a transporter 100, a liquid dispenser 200, a gas injector 300, and one or more fluid chambers 126 (openings to the fluid chambers 126 are shown in FIG. 3). In general, each fluid chamber 126 contains a freezing fluid, such as a cryogenic liquid (e.g., liquid nitrogen), and the transporter 100 is configured to transport each fluid chamber between a first position below the liquid dispenser 200 and a second position below the gas injector 300. The liquid dispenser 200 is configured to dispense a droplet of liquid into a respective fluid chamber 126 when the respective fluid chamber 126 is in the first position. The gas injector 300 is configured to inject a gas stream transversely to a surface of the freezing fluid contained in the respective fluid chamber 126 when the respective fluid chamber 126 is in the second position.

Figure 7:
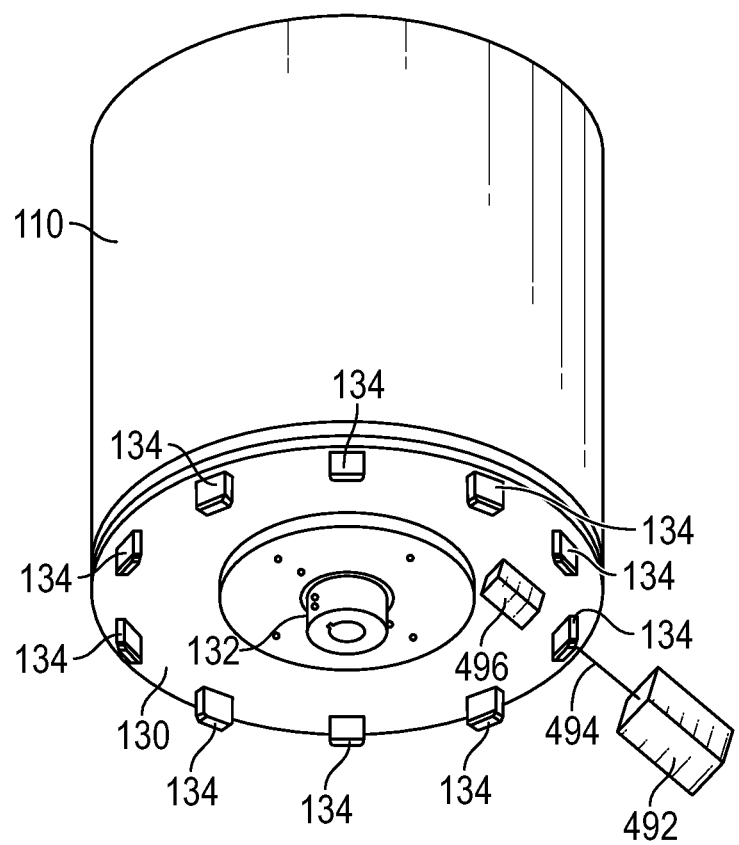
FIG. 7 is a bottom perspective view of the drum.

In one example, the transporter 100 comprises a carousel configured to move each fluid chamber 126 about an axis of rotation between the first position and the second position. As shown in FIGS. 3 and 4, the carousel may comprise a drum 110, a lid cover 120 enclosing an upper end of the insulated drum 110, and a base 130 enclosing a bottom end of the insulated drum 110. In some examples, the drum 110 is comprised of stainless steel and houses the fluid chambers 126. In some examples, the lid cover 120 is removably coupled to the drum 110. Referring to FIGS. 4 and 7, the carousel further comprises a spindle 132 projecting through the base 130 and aligned with a central opening 122 of the lid cover 120. As shown in FIG. 4, the apparatus 1000 comprises a motor 150 disposed underneath the base 130 and coupled to the spindle 132 such that the axis of rotation of the carousel extends through the spindle 132. The motor 150 is configured to drive rotation of the spindle 132, thereby triggering rotation of the carousel such that the base 130, the drum 110, and the lid cover 120 rotate about the axis of rotation. In one example, the motor 150 is configured to rotate the carousel at a rate about 1.5 revolutions per minute (RPM).

Figure 5:
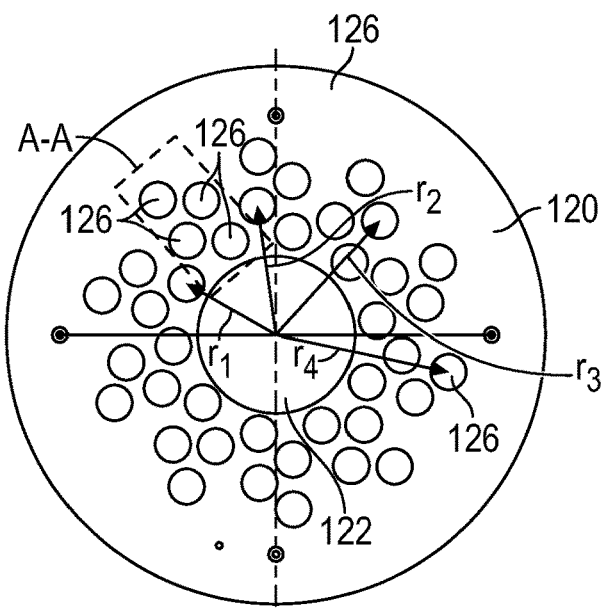
FIG. 5 is a top plan view of an insulated drum of the apparatus including a plurality of fluid chamber openings.

In some examples, the fluid chambers 126 are disposed in the drum 110 and arranged around the central opening 122 and the spindle 132. In some examples, the carousel comprises an insulation layer (not shown) disposed between the drum 110 and the fluid chambers 126 to minimize heat transfer between the freezing fluid and the ambient air outside the drum 110. The insulation layer may be comprised of air, a noble gas (e.g., argon), or a material having a low thermal conductivity (e.g., polymeric foam). In one example, each fluid chamber 126 comprises a tube disposed beneath the lid cover 120. In another example, each fluid chamber 126 comprises a cylindrical wall integrally fixed to a lower surface of the lid cover 120. As shown in FIGS. 3 and 5, the lid cover 120 includes an opening for each fluid chamber 126 spaced around the central opening 122, in which each opening is aligned with a respective fluid chamber 126 to provide access to the respective fluid chamber. In the illustrative example, the openings are shaped as circles having one inch diameters. In other examples, the openings may have other shapes or different sizes to accommodate for dispensed liquid droplets of various sizes.

Referring to FIG. 5, in one example, the openings of the fluid chambers 126 may be arranged in groups. As shown in FIG. 5, one group of openings 126 is indicated by annotated box A-A shown in FIG. 5 and includes four openings of fluid chambers 126. In the illustrative example, each opening is displaced from the center of the lid cover 120 by a different radius $r_1$, $r_2$, $r_3$, or $r_4$, in which each respective radius $r_1$, $r_2$, $r_3$, and $r_4$ is measured from the center of the central opening 122 to the center of the respective opening of the fluid chamber 126. In the illustrative example shown in FIG. 5, an edge of one of the openings in the group closest to the central opening 122 is set such that the edge is separated from the center of the central opening 122 at a first predetermined radius, and an edge of another one of the openings in the group furthest from the central opening 122 is set such that the edge is separated from the center of the central opening at a second predetermined radius. Accordingly, all the openings of the group are located between the first predetermined radius and second predetermined radius. In one example, the first predetermined radius defined from the edge of the opening closest to the central opening 122 to the center of the central opening is set at about 2 inches, and the second predetermined radius defined from the edge of the opening furthest from the central opening 122 to the center of the central opening 122 is set at about 5 inches.

In some examples, the transporter 100 further comprises a pellet collector disposed in the drum 110, whereby the pellet collector is configured to receive the frozen droplets that sink toward the bottom of the fluid chambers 126. In some examples, the pellet collector comprises a strainer basket that includes a plurality of holes to permit freezing fluid to pass through the strainer basket while retaining the sunken frozen droplets. In one example, as shown in FIGS. 3 and 4, the pellet collector may comprise a handle rod 140 extending through the central opening 122 of the lid cover 120. The handle rod 140 is configured to be grasped so that the pellet collector may be removed from the drum 110 to collect the sunken frozen droplets. In some examples, the strainer basket is disposed in the fluid chamber 126 and extends along the interior surface of the fluid chamber 126 to receive frozen droplets. In some examples, the strainer basket is disposed in the drum 110 and beneath the fluid chambers 126 such that a bottom of each fluid chamber 126 opens into the strainer basket to receive frozen droplets.

Freezing fluid is supplied to each fluid chamber 126 such that the surface level of the freezing fluid remains within a predetermined distance from the lid cover 120. In some examples, the predetermined distance between the surface level of the freezing fluid and the lid cover 120 is set between about ⅛ of an inch to one inch. In some examples, the surface level of freezing fluid in each fluid chamber 126 is monitored to account for the volatility of the freezing fluid. Accordingly, if the surface level of freezing fluid lowers due to evaporation, more freezing fluid is supplied to the freezing fluid chambers 126.

Referring to FIGS. 3 and 4, in one example, the liquid dispenser 200 is mounted to a mounting post 220 arranged along a side of the transporter 100. The gas injector 300 is mounted to a mounting post 320 arranged along the side of the transporter 100 and spatially separated from the mounting post 220. In one example, mounting post 220 comprises an upright post 210 fixed to a mounting base 212, a lateral bracket 222 connected to an end of the upright post 210, and a nozzle bracket 224 extending laterally from a free end of the lateral bracket 222. In one example, mounting post 320 comprises an upright post 310 fixed to a mounting base 312, a lateral bracket 322 connected to an end of the upright post 320, and a nozzle bracket 324 extending laterally from a free end of the lateral bracket 322.

Figure 6:
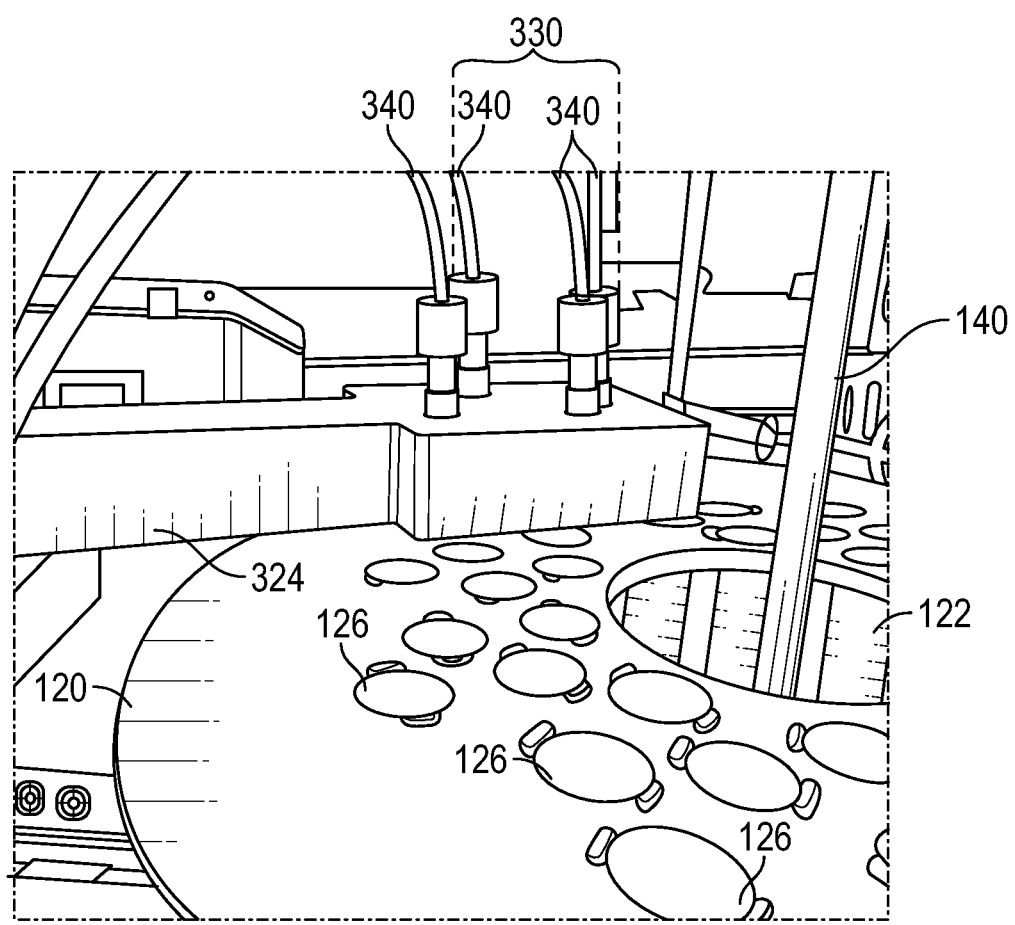
FIG. 6 is a close-up, partial perspective view of the gas injector and a portion of the top of the drum.

As shown in FIG. 3, the liquid dispenser 200 includes one or more dispenser nozzles 230 extending through retention holes formed in the nozzle bracket 224. In some examples, each dispenser nozzle 230 is positioned above the lid cover 120 at a radius $r_1$, $r_2$, $r_3$, or $r_4$ corresponding to the positions of the openings to the fluid chambers 126 such that each nozzle 230 is aligned with a center of a respective fluid chamber 126 when fluid chamber 126 is set at the first position. In other examples, the dispenser nozzles 230 may be located above the lid cover 120 whereby each dispenser nozzle 230 is aligned with any position within the diameter of the hole of a respective fluid chamber 126 when set at the first position. As shown in FIGS. 3 and 6, the gas injector 300 includes one or more injector nozzles 330 extending through retention holes formed in the nozzle bracket 324. In some examples, each injector nozzle 330 is positioned above the lid cover 120 at a radius $r_1$, $r_2$, $r_3$, or $r_4$ corresponding to the positions of the openings to the fluid chambers 126 such that the each nozzle 330 is aligned with a center of the opening of a respective fluid chamber 126 when the fluid chamber is set at the second position. In other examples, the injector nozzles 330 may be located above the lid cover 120 whereby each injector nozzle 330 is aligned with any position within the diameter of the hole of a respective fluid chamber 126 when set at the second position.

In one example, the dispenser nozzles 230 and injector nozzles 330 are disposed within the respective nozzle bracket 224, 324 in an arrangement corresponding to the arrangement of the openings of fluid chambers 126 as shown in box A-A of FIG. 5. Referring to FIG. 3, the liquid dispenser 200 comprises a set of four dispenser nozzles 230 aligned with a respective group of openings of fluid chambers 126 that is positioned beneath the nozzle bracket 224. Referring to FIGS. 3 and 6, the gas injector 300 comprises a set of four dispenser nozzles 330 aligned with another respective group of openings of fluid chambers 126 that is positioned underneath the nozzle bracket 324. Accordingly, as the transporter 100 rotates, a first group of openings of the fluid chambers 126 becomes aligned with the set of dispenser nozzles 230 when positioned beneath the nozzle bracket 224, and a second group of openings of the fluid chambers 126 becomes aligned with the set of injector nozzles 330 when positioned beneath the nozzle bracket 324. In other examples, the dispenser nozzles 230, the injector nozzles 330, and the openings of the fluid chambers 126 may be set in other arrangements that simultaneously allow a set of dispenser nozzles 230 to dispense fluid into a first group of openings of fluid chambers 126 and a set of injector nozzles 330 to inject gas into a second group of openings of fluid chambers 126.

The liquid dispenser 200 includes a liquid feed line 240 (e.g., hoses, tubes, etc.) connecting each dispenser nozzle 230 to a liquid reservoir (not shown). The gas injector 300 includes a gas feed line 340 (e.g., hoses, tubes, etc.) connecting each injector nozzle 330 to a source of compressed gas (not shown).

In some examples, the liquid reservoir contains an aqueous solution of reagents, and the liquid dispenser 200 includes a pump system (not shown) that conveys the liquid reagent from the liquid reservoir to the liquid dispenser through the associated liquid feed line. The pump system allows the liquid dispenser 200 to control the flow rate of liquid reagent passing through the liquid feed line 240 and the frequency of liquid droplets dispensed into the fluid chambers. The liquid dispenser 200 is configured to dispense individual drops of liquid reagent from the dispenser nozzle 230 into the openings of the fluid chambers 126. The dispenser nozzle 230 includes an orifice (not shown) that is configured to provide substantially uniform drop size. A variety of dispenser nozzles 230 may be used so long as sufficient uniformity of drop size is provided. The dispenser nozzles 230 may be made of Trifluoroethylene or some other polymer with equivalent rigidity and surface characteristics. The size of the orifice in the dispenser nozzle 230 will depend upon the composition of the liquid reagent and the operating pressure used to pump the reagent. In one example, the dispenser nozzle 230 is tapered, and a wall thickness of the dispenser nozzle 230 may vary based on the properties of the liquid reagent being dispensed.

The tip of the dispenser nozzle 230 is preferably located a sufficient distance above the surface of the freezing fluid contained in the fluid chamber to permit the dispensed liquid droplet to form a sphere before landing on the surface of the freezing fluid. However, spacing the tip of the dispenser nozzle 230 too great a distance above the surface of the freezing fluid surface permits the dispensed liquid droplet to break up into multiple droplets prior to contacting the freezing fluid. Furthermore, if the tip of the dispenser nozzle 230 is too close to the surface of the freezing fluid, then the dispensed liquid droplet freezes too rapidly once contacting the freezing fluid or promotes splashing of the freezing fluid. Accordingly, in some examples, the tip of the dispenser nozzle 230 is positioned between about ¾ of an inch and about 2 inches above the surface of the freezing fluid. The precise distance between the tip of the dispenser nozzle 230 used will depend upon the particular design of the apparatus, the design of the dispenser nozzle 230 used, and characteristics of the liquid to be dispensed. This distance can be determined by minimal experimentation once other design variables are specified. In some examples, the tips of the liquid dispenser nozzle 230 and the injector nozzle 330 are located about ½ inch above the lid cover 120 having a thickness about ¼ of an inch, whereby the surface of the freezing fluid is set about ⅛ of an inch to about 1 inch below a bottom surface of the lid cover 120.

Figure 8:
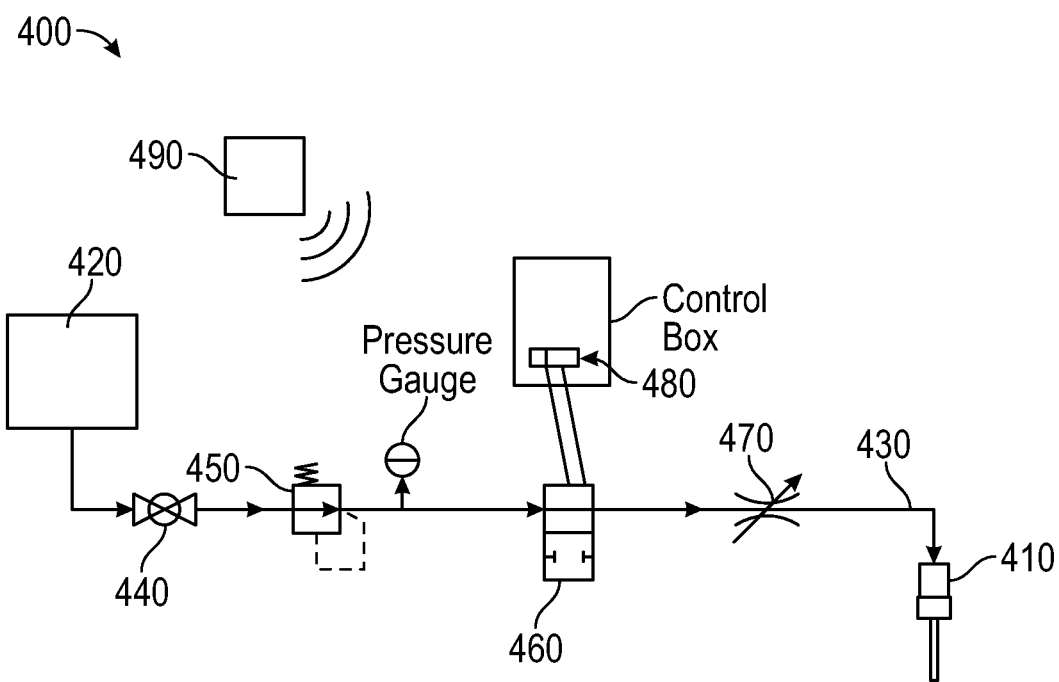
FIG. 8 is a schematic drawing of a system for delivering and controlling gas flow to a gas injector.

FIG. 8 illustrates a schematic diagram of a gas delivery and control system 400 according to one example. The system 400 comprises an injector nozzle 410, a source of compressed gas (e.g., a tank or a compressor) 420, and a feed line 430 connecting the injector nozzle 410 to the source of compressed gas 420. The source of compressed gas 420 is configured to generate a stream of gas that is conveyed via the feed line 430 to the nozzle 410. The system 400 may include an isolation valve 440 (e.g., ball valve) disposed along the feed line 430 and configured to selectively stop the stream of gas along the feed line 430 (e.g., for maintenance purposes or detection of a leak). The system 400 may include a pressure regulator 450 disposed along the feed line 430 and downstream of the isolation valve 440. The pressure regulator 450 is configured to control the pressure of the gas flow along the feed line 430. The system 400 may include a solenoid valve 460 disposed along the feed line 430 and downstream of the pressure regulator 450. The solenoid valve 460 is configured to control the gas flow to the nozzle 410 by switching between a closed position to shut-off the gas stream from reaching the nozzle 410 and an open position to permit the gas stream to reach the nozzle 410. The system 400 may include a flow valve 470 disposed along the feed line 430 and downstream of the solenoid valve 460 and configured to control the flow rate of the gas stream reaching the injector nozzle 410. The combination of the pressure regulator 450 and flow valve 470 allow the control of supply pressure at the injector nozzle 410. The supply pressure to the injector nozzle 410 is regulated to inject a stream of gas with enough pressure to adequately disturb the surface tension of the freezing fluid. The supply pressure to the injector nozzle 410 is further regulated to limit the pressure such that the stream of gas does not promote splashing of the freezing fluid. In one example, the injector nozzle 410 is configured to inject a stream of gas at a supply pressure range of about 10 to 40 pounds per square inch (PSI). In some preferred examples, the injector nozzle 410 is configured to inject a stream of gas at a supply pressure range of about 20 to 30 PSI.

The delivery and control system 400 may allow the injector nozzle 410 to inject gas into a fluid chamber in short bursts only when the fluid chamber is positioned beneath the injector nozzle 410 or may allow the injector nozzle 410 to dispense a constant stream of gas, whereby the fluid chambers move in and out of the stream of gas by relative movement between the fluid chamber and the injector nozzle 410. Referring to FIG. 8, in some examples, the delivery and control system 400 comprises a control unit 480 in communication with the solenoid valve 460 to control operation of the solenoid valve 460. In one example, the system 400 is configured to inject gas only when a fluid chamber is disposed beneath the injector nozzle 410, so the control unit 480 is configured to open the solenoid valve 460 based on a detected position of the injector nozzle 410 with respect to a fluid chamber. In one example, the system 400 may include a sensor 490 that monitors the position of the transporter 100 and communicates to the control unit 480 to open the solenoid valve 460 when the transporter 100 is in a position placing a fluid chamber 126 beneath the nozzle 410.

In one example, the control unit 480 includes one or more processors, computer storage media (e.g., volatile and non-volatile memory), and one or more connectors, receivers, transmitters, and transceivers linked to the sensor 490 and the solenoid valve 460. The control unit 480 is in electrical communication with the sensor 490 and is configured to receive the signal from the sensor 490. The control unit 480 is configured to determine the rotation rate or the angular position of the transporter 100 (e.g., the base 130 or drum 110) based on the received signal. The control unit 480 is in electrical communication with the solenoid valve 460 and configured to transmit a command to the solenoid valve 460 to switch between the open and closed positions based on the rotation rate or angular position of the transporter 100. Accordingly, the control unit 480 allows the gas injector 400 to selectively inject the gas stream based on the rotation rate or angular position of the transporter 100.

In one example, the control unit 480 controls the gas injector 400 to inject the gas stream transversely to the surface of freezing fluid contained in a respective fluid chamber only when the respective fluid chamber is in the second position. In one example, the gas injector 400 starts injecting the stream of gas once a leading edge of the fluid chamber is positioned below the injector nozzle 410 and continues injecting the stream of gas until a trailing edge of the fluid chamber is positioned below the injector nozzle 410, such that the stream of gas strikes the surface of the freezing fluid transversely along the entire diameter of the fluid chamber. After the trailing edge of the fluid chamber moves away from the injector nozzle 410, the control unit 480 commands the solenoid valve 460 to switch to the closed position, thereby terminating the gas flow until a leading edge of another fluid chamber is positioned underneath the injector nozzle 410. In other examples, the gas injector 400 is configured to inject the gas stream continuously while the carousel is moving each fluid chamber between the first and second positions.

In one example, the sensor 490 is an optical sensor disposed beneath the base 130 of the transporter 100 and comprises a transmitter (492) configured to transmit a light beam 494 and a receiver (496) configured to receive the light beam. Interference of the received light beam triggers the sensor 490 to generate a signal. In one example, as shown in FIG. 7, the transporter 100 includes a plurality of projections 134 spatially arranged along a perimeter of the base 130, whereby each respective projection 134 is configured to rotate between the transmitter 492 and the receiver 496 of the sensor 490, thereby triggering the sensor 490 to generate a signal when one of the projections 134 blocks the light beam 494. The sensor 490 is configured to generate a signal that indicates the angular position of the transporter 100. In one example, the angular separation between the projections 134 along the perimeter of the base 130 corresponds to the angular separation between each group of openings of the fluid chambers 126 (e.g., as shown in box A-A of FIG. 5) along the lid cover 120 such that each projection 134 corresponds to a respective group of openings of fluid chambers 126. Accordingly, each projection 134 is configured to trigger the sensor 490 when a respective group of openings of fluid chambers 126 is aligned with a set of injector nozzles 330 and another respective group of openings of fluid chambers 126 is aligned with a set of dispenser nozzles 230. In another example, the angular displacement between each pair of projections 134 corresponds to a respective group of openings of fluid chambers 126 such that detection of one of the projections 134 by the sensor 490 triggers the dispenser nozzle 230 to stop dispensing liquid droplets and the injector nozzle 330 to stop injecting a stream of gas.

Process for Preparation of Frozen Reagent Spheres

A non-limiting exemplary process for producing and collecting frozen reagent spheres is described herein. In some non-limiting examples, the method 50 and apparatus 1000 described above may be implemented for the exemplary process of producing and collecting frozen reagent spheres, as described herein. In one example, a bulk liquid reagent may be prepared in a bulk reagent bottle. The bulk liquid reagent was dispensed in aliquots (e.g., 24 µL sample size) by a liquid dispenser, such as the liquid dispenser 200 shown in FIGS. 3 and 4, into a freezing fluid (e.g., cryogenic liquid). The bulk liquid reagent may be supplied to the liquid dispenser by a pump (e.g., an IVEK™ pump). In one example, the pump comprises four separate feed lines that are each configured to independently transfer an aliquot of the bulk reagent through a liquid dispenser nozzle, such as the liquid dispenser nozzle 230 shown in FIGS. 3 and 4, and into a fluid chamber, such as the fluid chamber 126 shown in FIG. 3, containing liquid nitrogen (LN2). The dispensing rate of aliquots may vary based on several factors, such as the configuration of the LN2 bath, the physical parameters of the droplet, and the rotation speed of the fluid chambers. In one example, an aliquot of liquid may be dispensed at a rate of about every 3.2 seconds.

The LN2 may be held in a stainless steel drum enclosed with a lid cover, such as the drum 110 and cover 120 shown in FIGS. 3 and 4. The drum may comprise a bath (e.g., 50 gallon bath) configured to hold the LN2. The lid cover may comprise a plurality of bored holes, which form the fluid chambers. The plurality of fluid chambers may be arranged in groups of four fluid chambers, such as the group of fluid chambers 126 shown in FIG. 5, whereby each respective fluid chamber in the group is aligned with a respective liquid dispenser nozzle when the group of fluid chambers is set in a first position. To increase throughput, the fluid chambers and the LN2 bath may be rotated by rotating the drum about a spindle so that the first group of fluid chambers each receive a first dispensed aliquot of liquid reagent. Sometimes, the dispensed aliquot of liquid reagent may float on the surface of the LN2 before sinking to the bottom of the LN2 filled bath. To ensure that the first dispensed aliquot of liquid reagent sinks below the surface of the LN2 before dispensing a second aliquot of liquid reagent, the first group of fluid chambers may be rotated from the first position to a second position, in which the first group of fluid chambers are disposed under a set of gas injector nozzles. As the first group of fluid chambers move toward the second position, a second group of fluid chambers are moved to be aligned with the liquid dispense nozzles. Accordingly, a second aliquot of liquid reagent may then be dispensed into the second group of fluid chambers. The second group of fluid chambers may then be rotated to the second position such that the fluid chambers of the second group are disposed underneath the gas injector nozzles. The cycle of dispensing aliquot of liquid reagent into fluid chambers of a respective group and transporting the fluid chambers of the respective group to a second position may be repeated to prepare a batch of frozen liquid reagent spheres.

The rotational rate of the drum and the dispensing rate of the pump may be coordinated by providing projections attached to the base of the drum, such as the base 130 shown in FIG. 7, a transmitter, and a sensor, such as the sensor 490 shown in FIG. 4. In some examples, the lid cover is connected to the drum, such as the lid cover 120 and drum 110 shown in FIG. 3, so that the lid cover may rotate with the drum about the axis of rotation defined by the spindle. Coordinating the lid cover rotation rate with the pump dispenser rate ensures that the dispensed aliquot of liquid reagent drops into the fluid chambers. In some examples, a motor, such as the motor 150 shown in FIG. 4, is coupled to the base of the drum by the spindle so that the rotational rate of the drum may be controlled by controlling the speed of the motor.

The lid cover may rotate at a rate of about 1.5 RPM. The rotational rate may be selected based on a radius defined between the fluid chambers and a central point of the lid cover. Because the average dwell time of the dispensed liquid reagent in the freezing fluid is calculated to be about 10 seconds in some examples, the rotational speed (e.g., RPM) of the motor is selected to provide adequate time for most of the dispensed aliquots of liquid reagent to fall below the surface of the LN2 before the fluid chamber rotates back to the first position under the liquid dispense nozzle and receives a second aliquot of liquid reagent.

However, for a number of reasons, not all dispensed aliquots of liquid reagents will sink below the surface of the LN2 within a single revolution. Accordingly, in some examples, a gas injector, such as the gas injector 300 shown in FIG. 3, is disposed adjacent to the drum, and the gas injector comprises plurality of gas injector nozzles arranged to align with each group of fluid chambers when set at the second position. In some examples, the gas injector comprises a tank containing pressurized oxygen, four gas feed lines, and an injector nozzle connected to each gas feed line, such as the gas delivery system shown in FIG. 8. The gas injector nozzles may be placed to inject a stream of air transverse to a surface of the fluid contained in the fluid chamber at about 10 seconds after the fluid chamber initially rotates away from the first position under the liquid dispense nozzle. In some examples, the time interval between when the fluid chamber initially rotates away from the first position to the second position and when the gas injector injects a stream of gas is set to be longer than the average dwell time. The gas injector may be configured to deliver a burst of air when the fluid chamber reaches the second position, in which the fluid chamber is aligned with the nozzle of the gas injector. In some examples, the gas delivery system further comprises a pressure gauge, pressure regulator, solenoid and flow valves, and a control unit, such as the gas delivery system shown in FIG. 8, to ensure that the injection of air from the gas injector is properly timed with the positioning of the fluid chamber.

In some examples, the plurality of gas injector nozzles are each configured to inject a stream of air transversely to the surface of the fluid contained in the fluid chamber to disrupt the surface tension of the LN2. Accordingly, any aliquot of liquid reagent floating on the surface of the LN2 will sink into the LN2 before the fluid chamber returns to the first position under the fluid dispense nozzle to receive a second dispensed aliquot of liquid reagent.

Figure 9:
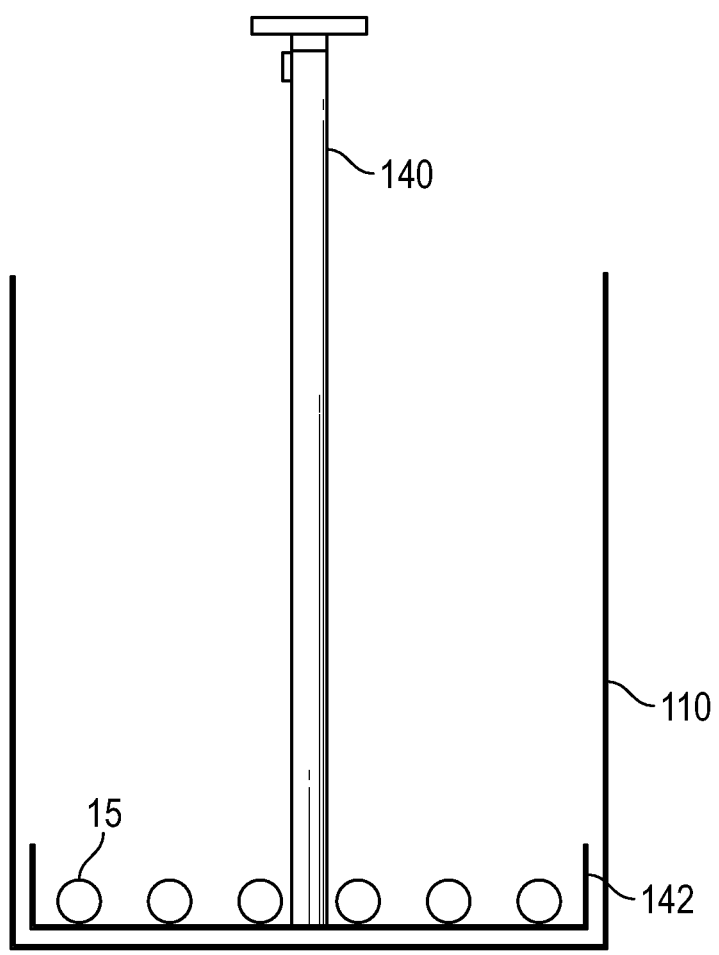
FIG. 9 is a schematic drawing of a fluid chamber and a strainer basket for retrieving frozen reagent spheres from the fluid chamber.

Following a number of cycles, the liquid and air burst dispensing may be stopped, and the rotation of the drum and the lid cover may be stopped. The fluid contained in the fluid chambers freeze the aliquots of dispensed liquid reagents into frozen spheres, which sink toward the bottom of the fluid chamber. To recover the frozen spheres, a strainer basket may be disposed along a bottom interior of the drum. For example, as shown in FIG. 9, a strainer basket 142 disposed within drum 110 may be attached to a basket recovery shaft that extends through a central opening of the lid cover, such as the handle rod 140 (also shown in FIG. 3). Accordingly, frozen reagent spheres 15 captured by the strainer basket 142 may be collected by grasping and pulling the handle rod 140 such that the strainer basket 142 is removed from the drum 110. Once removed from the LN2, the frozen reagent spheres 15 may be transferred to a lyophilization tray to undergo a lyophilization process.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(b), unless and until such claim limitations expressly use the phrase "means for" followed by a statement of function void of further structure.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An apparatus comprising: a plurality of fluid chambers, each containing a freezing liquid; a transporter configured to move the plurality of fluid chambers about an axis of rotation, wherein the plurality of fluid chambers comprises two or more groups of fluid chambers, each group of fluid chambers being located at a different corresponding radial distance from the axis of rotation; two or more liquid dispensers disposed above a surface of the freezing liquid contained in the plurality of fluid chambers, wherein each of the two or more liquid dispensers is located at the corresponding radial distance from the axis of rotation at which a different one of the groups of fluid chambers is located, and wherein each liquid dispenser is configured to dispense a droplet of liquid onto the freezing liquid contained in one of the plurality of fluid chambers of the group of fluid chambers located at the corresponding radial distance; and two or more gas injectors disposed above the surface of the freezing liquid contained in the plurality of fluid chambers, wherein each of the two or more gas injectors is located at the corresponding radial distance from the axis of rotation at which a different one of the groups of fluid chambers is located, and wherein each gas injector of the two or more gas injectors is configured to inject a stream of gas transversely to the surface of the freezing liquid contained in one of the plurality of fluid chambers of the group of fluid chambers located at the corresponding radial distance, wherein movement of the plurality of chambers about the axis of rotation by the transporter sequentially positions different fluid chambers of each group of fluid chambers below the liquid dispenser located at the corresponding radial distance and sequentially positions the different fluid chambers of each of the group of fluid chambers below each of the gas injector of the two or more gas injectors located at the corresponding radial distance, wherein the fluid chamber positioned below the liquid dispenser located at each of the corresponding radial distances is different from the fluid chamber positioned below each of the gas injector of the two or more gas injectors at the same corresponding radial distance.

2. The apparatus of claim 1, wherein the transporter comprises a carousel configured to move the plurality of fluid chambers about the axis of rotation.

3. The apparatus of claim 2, wherein the carousel comprises a drum and the plurality of fluid chambers are disposed within the drum.

4. The apparatus of claim 3, wherein the carousel comprises a spindle configured to rotate about the axis of rotation, and the spindle is coupled to the drum such that the drum is configured to rotate with the spindle about the axis of rotation.

5. The apparatus of claim 3, wherein the carousel comprises a lid coupled to a top end of the drum, wherein the plurality of fluid chambers are disposed beneath the lid, and the lid comprises a plurality of openings, and each opening is aligned with one of the plurality of fluid chambers the fluid chamber.

6. The apparatus of claim 3, wherein the carousel comprises an insulation layer disposed between the drum and the plurality of fluid chambers.

7. The apparatus of claim 3, wherein the carousel comprises a strainer basket disposed in the drum, and the strainer basket is configured to receive and hold a frozen droplet sinking through the freezing liquid contained in the plurality of fluid chambers toward a bottom of the drum.

8. The apparatus of claim 1, wherein each of the gas injector of the two or more gas injectors comprises a nozzle, and wherein the nozzle is configured to inject the gas stream transversely to the surface of the freezing liquid contained in each fluid chamber located at the corresponding radial distance, and wherein the apparatus further comprises: a solenoid valve controlling gas flow to the nozzle and configured to switch between a closed position to shut-off the gas stream from reaching the nozzle and an open position to permit the gas stream to reach the nozzle; a sensor configured to generate a signal relating to a position of the transporter; and a control unit in electrical communication with the sensor and the solenoid valve, wherein the control unit is configured to receive the signal from the sensor and transmit a command to the solenoid valve to switch between the open and closed positions based on the signal.

9. The apparatus of claim 1, wherein the transporter is configured to transport each fluid chamber from a first position below the liquid dispenser located at the corresponding radial distance to a second position below each of the gas injector of the two or more gas injectors located at the corresponding radial distance at a predetermined dwell time so that the droplet of liquid dispensed by the liquid dispenser freezes to a frozen droplet before each of the gas injector of the two or more gas injectors injects the stream of gas transversely to the surface of the freezing liquid contained in the fluid chamber.

* * * * *